United States Patent [19]
Tajima et al.

[11] Patent Number: 4,783,433
[45] Date of Patent: Nov. 8, 1988

[54] SELECTIVE ADSORBENT FOR CO AND METHOD OF MANUFACTURING THE SAME

[75] Inventors: Kazuo Tajima; Yo Osada, both of Tokyo, Japan

[73] Assignee: Nippon Kokan Kabushiki Kaisha, Tokyo, Japan

[21] Appl. No.: 929,089

[22] Filed: Nov. 10, 1986

[30] Foreign Application Priority Data

Nov. 19, 1985 [JP] Japan ................. 60-257820
Nov. 19, 1985 [JP] Japan ................. 60-257821
Oct. 2, 1986 [JP] Japan ................. 61-233349

[51] Int. Cl.$^4$ .................................... B01J 20/18
[52] U.S. Cl. ................................. 502/74; 502/60; 502/79
[58] Field of Search ...................... 502/60, 79, 74

[56] References Cited

U.S. PATENT DOCUMENTS

| | | | |
|---|---|---|---|
| 3,185,540 | 5/1965 | Breck et al. | 423/328 |
| 3,236,761 | 2/1966 | Rabo et al. | 208/111 |
| 3,346,328 | 10/1967 | Jergeys et al. | 502/79 |
| 3,497,462 | 2/1970 | Kruerke | 252/455 Z |
| 3,649,177 | 10/1969 | Rosback | 502/79 |
| 3,755,540 | 8/1973 | Rosback | 423/328 |
| 4,019,879 | 4/1977 | Rabo et al. | 55/68 |
| 4,034,065 | 7/1977 | Kasai et al. | 423/328 |
| 4,470,829 | 9/1984 | Hirai et al. | 55/68 |
| 4,539,020 | 9/1985 | Sakuraya et al. | 55/68 |

FOREIGN PATENT DOCUMENTS 0170884 7/1985 European Pat. Off. .

OTHER PUBLICATIONS

Zeolite Chemistry and Catalysis, Jule A. Rabo, editor, ACS Monograph 171, ACS, Washington, D.C., 1976 pp. 264–265 (3.Ward).
Journal of Catalysis, vol. 30, pp. 187–194; 1973; "Selective Adsorption of Carbon Monoxide and Complex Formation of Cuprous–Ammines in Cu(1)Y Zeolites.
A Comprehensive Treatise on Inorganic and Theoretical Chemistry by J. W. Mellor, vol. III, pp. 157–191.

*Primary Examiner*—Carl F. Dees
*Attorney, Agent, or Firm*—Frishauf, Holtz, Goodman & Woodward

[57] ABSTRACT

This invention proposes an adsorbent containing mainly Cu(I) ion-exchanged and carried in a cation exchange site of a zeolite at an ion exchange ratio of not less than 50%, the zeolite having a silica/alumina ratio of not more than 10, and a salt of a least one metal selected from the group consisting of Cu(I), Fe, Zn, Ni, and Mg, the metal salt being dispersed and carried in pores of the zeolite. This invention also proposes a method of manufacturing the above adsorbent.

20 Claims, 6 Drawing Sheets

F I G. 8
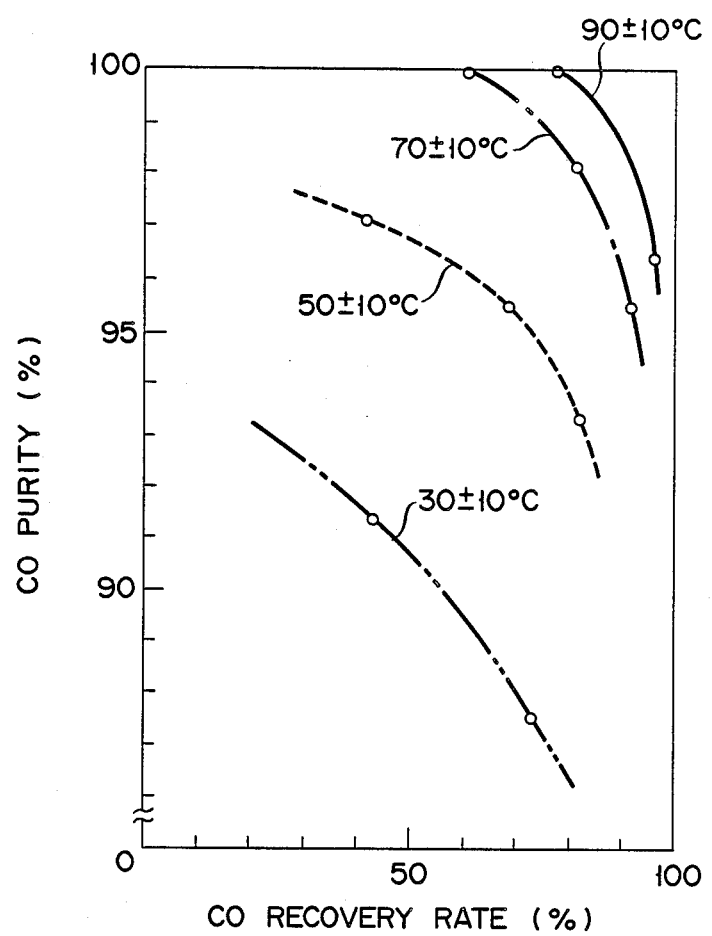

SELECTIVE ADSORBENT FOR CO AND METHOD OF MANUFACTURING THE SAME

BACKGROUND OF THE INVENTION

The present invention relates to an adsorbent suitable for selectively adsorbing or separating CO by a PSA (pressure swing adsorption) method, and a method of manufacturing the same.

Japanese Patent Disclosure (Kokai) No. 58-156517 discloses a solid adsorbent containing copper halide(I) and active carbon as a CO adsorbent. However, stable use of this adsorbent for a long period of time has never been reported. U.S. Pat. No. 4,019,879 describes an adsorbent prepared by carrying Cu(I) in zeolite whose silica/alumina ratio is as high as 20 to 200. In zeolite having such a high silica/alumina ratio, it is known that the number of cations capable of ion exchange tends to be reduced. It may be concluded that the CO adsorption amount per unit weight is reduced.

A CO desorption technique by the PSA method has been developed as a typical adsorption method. For example, Japanese Patent Disclosure (Kokai) No. 59-22625 describes a two-step treatment for performing a PSA to eliminate moisture and $CO_2$ in a pretreatment step. Japanese Patent Disclosure (Kokai) No. 59-26121 describes a two-step treatment of separating CO from a converter gas. According to this method, mordenite is used as an adsorbent, and $CO_2$-PSA and CO-PSA are separately performed. These conventional proposals indicate that the adsorbents have a large CO adsorption amount near room temperature. However, the $CO_2$ adsorption amount is larger than the CO adsorption amount. In order to separate CO from a gas mixture containing $CO_2$, $CO_2$ is separated from the gas mixture in the pretreatment, and then CO is separated by the CO-PSA process.

SUMMARY OF THE INVENTION

It is a first object of the present invention to provide an adsorbent and a method of manufacturing the same, wherein CO can be selectively separated from a gas mixture containing mainly CO, $CO_2$, and $N_2$ by a single step at a PSA temperature closer to room temperature, so that the separated CO can be condensed.

It is a second object of the present invention to provide an adsorbent and a method of manufacturing the same, wherein a large amount of gas can be treated by a smaller amount of adsorbent.

It is a third object of the present invention to provide an adsorbent and a method of manufacturing the same, wherein an adsorption tower and a treating gas need not be heated, thus reducing the operation cost.

It is a fourth object of the present invention to provide an adsorbent and a method of manufacturing the same, wherein a material for a switching valve and the like in a PSA apparatus need not be a heat-resistant material.

According to an aspect of the present invention, there is provided a selective adsorbent for CO, comprising: mainly Cu(I) carried in an ion exchange site of zeolite having a silica/alumina ratio of not more than 10 at an ion exchange ratio of not less than 50% and preferably not less than 70%; and a salt of at least one metal selected from the group consisting of Cu(I), Fe, Zn, Ni, and Mg, the salt being dispersed and carried in pores of the zeolite, the salt being more preferably a Cu(I) salt and most preferably a salt containing as a major constituent a halide such as a Cu(I) chloride, and the metal salt being contained in a total amount of 0.8 mmol to 2.5 mmol and more preferably 1.0 mmol to 2.0 mmol per gram of ion-exchange Cu(I) zeolite. Carbon monoxide can be selectively separated by the adsorbent at a temperature of 40° to 100° C.

According to another aspect of the present invention, there is provided a method of manufacturing the above adsorbent, comprising the steps of: ion-exchanging and carrying Cu(II) in a cation exchange site of the zeolite; dispersing and carrying mainly a Cu(II) salt in pores of the zeolite by an impregnation method; and reducing the Cu(II) and the Cu(II) salt with a reducing gas such as $H_2$ or CO to obtain mainly Cu(I) and a Cu(I) salt. After Cu(II) is carried by ion exchanging, the Cu(II) salt is preferably dispersed and carried by the impregnation method.

A method of manufacturing an improved adsorbent comprises the steps of: ion-exchanging and carrying Cu(II) in a cation exchange site of the zeolite; dispersing and carrying a Cu(II) salt in pores of the zeolite by an impregnation method; heating the Cu(II) salt dispersed and carried by the impregnation method to obtain a Cu(I) salt; and reducing Cu(II) and the remaining Cu(II) salt with a reducing gas such as $H_2$ or CO to obtain Cu(I) and a Cu(I) salt. After Cu(II) is carried by ion exchanging, the Cu(II) salt is preferably dispersed and carried by the impregnation method.

BRIEF DESCRIPTION OF THE DRAWINGS

FIG. 8 is a graph showing the relationship between the CO recovery ratio and the CO purity in experiments in Examples 6 to 8.

DESCRIPTION OF THE PREFERRED EMBODIMENT

A zeolite carrier may be of A, X, Y, or mordenite type if it has a silica/alumina ratio of 10 or less. If the silica/alumina ratio is decreased, the amount of a metal carried by an ion exchange method is increased, so that a CO adsorption amount tends to be increased. However, the resultant zeolite has poor resistance to acids and a high hydrophilic level. As a result, a moisture adsorption amount and hence a $CO_2$ adsorption amount tend to be increased. Since the zeolite has poor resistance to acids if the silica/alumina ratio is reduced, a pH of a solution must be controlled to prepare an adsorbent by the ion exchange method and then the impregnation method. In consideration of the chemical properties of zeolite, the silica/alumina ratio must be 10 or less. A preferable zeolite is a Y type zeolite with a silica/alumina ratio of about 5.

Cu(I), to be carried by the ion exchange method on a cation exchange site of zeolite, has an ion exchange ratio of 50% or more, and preferably 70% or more because an increase in ion exchange ratio increases the CO adsorption amount. A small amount of Cu(II) or Cu in addition to Cu(I) may be contained in the cation exchange site.

A metal salt carried in the pores of zeolite by an impregnation method is selected from salts of Cu(I), Fe, Zn, Ni, and Mg. When the amount of the metal salt carried in zeolite is increased, the $CO_2$ adsorption amount is reduced. As a result, a ratio of the CO adsorption amount to the $CO_2$ adsorption amount is larger than that of the basic Cu(Y) zeolite. The metal salt is preferably a halide, and more preferably a chloride such as $CuCl$, $FeCl_3$, $ZnCl_2$, $NiCl_2$, or $MgCl_2$. $CuCl$ may be obtained by reducing $CuCl_2$ with a reducing gas. Alternatively, $CuCl_2$ is heated and decomposed to produce $CuCl$.

Figure 6:
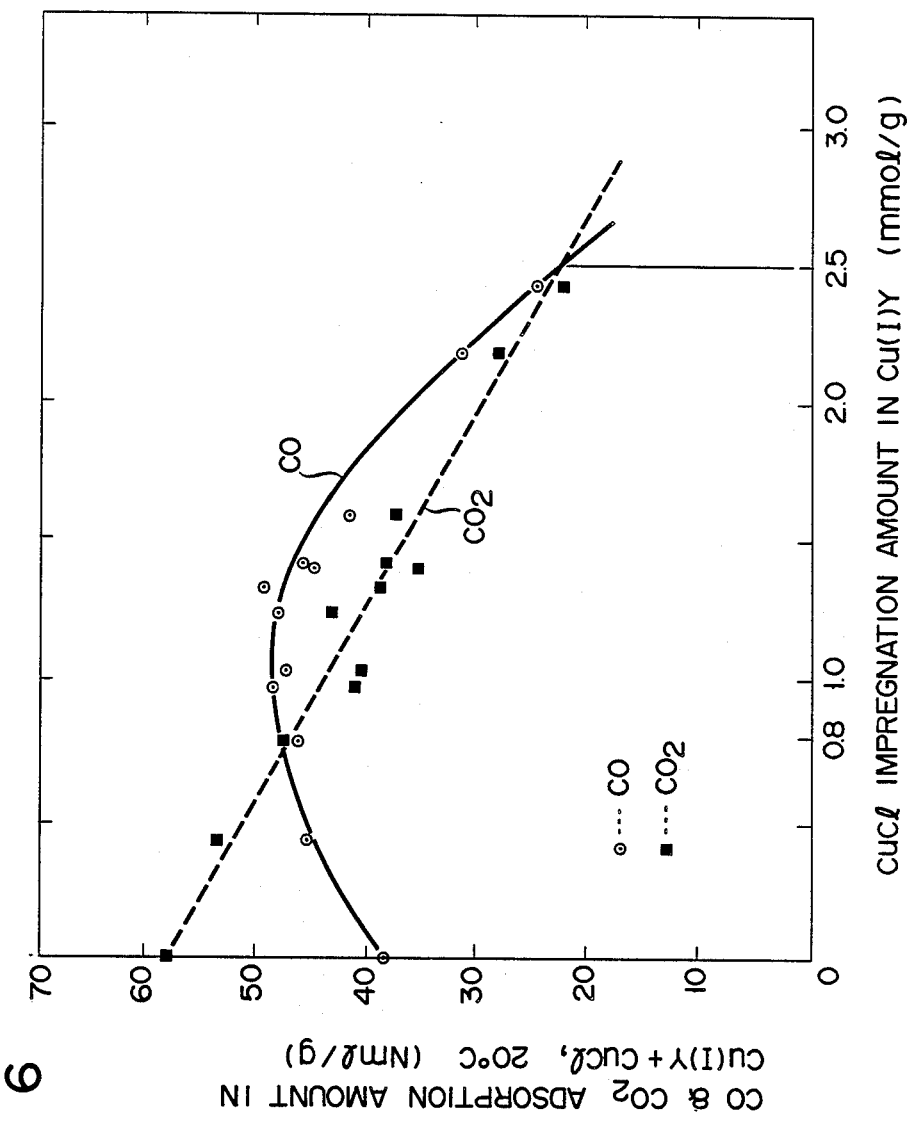
FIG. 6 is a graph showing the relationship between the CuCl impregnation amount and CO and $CO_2$ adsorption amounts in Cu(I)Y+CuCl in Example 4.

$CuCl$ has a $CO/CO_2$ adsorption amount ratio exceeding 1 at room temperature and is most preferable. If zeolite is impregnated with $CuCl$, the amount of $CuCl$ is approximately in proportion to the $CO_2$ adsorption amount. However, in association with the CO adsorption amount, an increase in $Cu^+$ increases the CO adsorption amount, and the pores are covered by the impregnation of $CuCl$ to reduce the surface area of zeolite. The impregnation amount of $CuCl$ falls within the range where the equilibrium adsorption amounts of CO and $CO_2$ at 20° C. are equal for 1 g of the ion exchange Cu(I) zeolite, i.e., preferably 0.8 to 2.5 mmol/g, and most preferably 1.0 to 2.0 mmol/g wherein a $CO/CO_2$ ratio is 1.1 or more. FIG. 6 is a graph showing an impregnation amount ratio of $CuCl/CuY$ and the CO and $CO_2$ adsorption amounts (20° C.) in $Cu(I)Y+CuCl$. $Cu(I)Y+CuCl$ is prepared by reducing $Cu(II)Y+CuCl_2$ in a CO gas atmosphere at a temperature of 250° C. for an hour.

The present inventors assumed methods of carrying a salt in zeolite having a silica/alumina ratio of 10 or less:

(1) an ion exchange method utilizing an ion exchange function as a property of zeolite; and (2) the ion exchange method and an impregnation method widely used in catalyst preparations.

According to the extensive studies of the present inventors, by only the ion exchange method, the metal ions were exchanged with cations such as $Na^+$, $K^+$, or $Ca^{+2}$ present to reinforce the charge at the Al point in the atoms constituting the zeolite crystal. Although the metal ions were uniformly dispersed, the amount thereof was limited by the silica/alumina ratio. An ion exchange ratio was 70 to 90% by normal manipulation. As a result, it was found that the adsorption characteristics could not be much improved as compared with those of the conventional proposals.

By only the impregnation method, some of cations such as $Na^+$, $K^+$, and $Ca^{2+}$ were exchanged with the metal ions described above. However, most of the cations were left in the crystal lattice of zeolite to fail utilization of the ion exchange function of the zeolite, and at the same time, the metal ions were not uniformly dispersed, as compared with the ion exchange method. Irregular dispersion on the outer surface and pores of the zeolite influenced the adsorption properties. The carrying amount of the metal ions could be easily controlled as compared with that according to the ion exchange method. However, the adsorption properties were found to be worse than those obtained by the ion exchange method.

Based upon the above experiment results, the present inventors combined the ion exchange method and the impregnation method and found an adsorbent capable of selectively separating CO in one step at a temperature closer to room temperature under the condition (CO adsorption amount) > ($CO_2$ adsorption amount).

Extensive studies were made by using the resultant adsorbent and a PSA test apparatus, assuming a normal converter gas in a steelmaking plant. It was found that an operation temperature required for 90 to 95% of product CO purity and 70% or more of CO recovery is 40° C. or more. Similarly, in order to obtain 98% or more of purity and 70% or more of CO recovery, the required operation temperature was found to fall within the temperature range of 60° C. to 100° C.

Even if the PSA is performed at a temperature of 100° C. or more by using the resultant adsorbent, no problems occur from the viewpoint of the desorption function. On the contrary, the CO desorption function is improved. However, if the operation temperature exceeds 100° C., the CO adsorption amount is gradually reduced, and the adsorption amount per unit amount of the gas to be treated is increased. In addition, energy for heating an adsorption tower and/or the gas to be treated is required. The amount of energy must be increased upon an increase in operation temperature. From an economical viewpoint, it is not suitable to set the operation temperature to be 100° C. or more.

By using the resultant adsorbent, CO desorption can be achieved at a temperature of less than 40° C. However, this temperature is not practical. If the operation temperature is less than 40° C., the adsorption properties are not degraded. However, properties in purging and desorption steps repeated in the PSA process are degraded. As a result, the purity and the recovery ratio of CO are impaired very much. A gas to be treated is adiabatically compressed by a compressor at the inlet port of the PSA apparatus in the range of 0.5 kg/cm³G to 7 kg/cm³G to increase the temperature of the gas, thereby setting the gas at a predetermined adsorption temperature and hence the adsorbent within the range of 40° C. to 100° C. According to this method, an external heating device can be eliminated, thus achieving an inexpensive process. Since the PSA operation temperature is closer to room temperature, energy for heating the adsorption tower and/or the gas to be treated need not be used, thereby greatly reducing the operation cost.

One method of manufacturing a selective adsorbent for CO comprises the steps of carrying Cu(II) in a cation exchange site of the zeolite by an ion exchange method, dispersing and carrying a salt of at least one metal selected from the group consisting of Cu(II), Fe, Zn, Ni, and Mg in pores of the zeolite, and reducing Cu(II) and a Cu(II) salt with a reducing gas such as $H_2$ or CO to obtain Cu(I) and a Cu(I) salt. Impregnation preferably follows ion-exchanging.

According to this method, it is preferable that chemically stable Cu(II) is carried in the zeolite.

A method of manufacturing an improved adsorbent comprises the steps of: ion-exchanging and carrying Cu(II) in a cation exchange site of the zeolite; dispersing and carrying a Cu(II) salt in pores of the zeolite by an impregnation method; heating the Cu(II) salt dispersed and carried by the impregnation method to obtain a Cu(I) salt; and reducing Cu(II) and the remaining Cu(II) salt with a reducing gas such as $H_2$ or CO to obtain Cu(I) and a Cu(I) salt. Impregnation preferably follows ion-exchanging.

According to this method, the Cu(II) salt carried by impregnation is heated in a temperature range where Cu(II) salt is decomposed into a Cu(I) salt. Thereafter, the Cu(II) salt is reduced with a reducing gas. Therefore, the Cu(II) salt can be easily converted into the Cu(I) salt stable in air. In the reduction step, generation of a toxic gas such as halogenated hydrogen is limited. At the same time, the Cu(II) carried by ion exchanging in the zeolite is reduced, thereby easily performing reduction. $CuCl_2$ carried by Cu(II)Y is heated in the temperature range of a temperature higher than a temperature at which a chemical reaction $CuCl_2 \rightarrow CuCl + Cl_2$ is initiated to a temperature at which a vapor pressure of $CuCl_2$ is 760 mmHg, i.e., in the range of 350° C. to 550° C., and preferably 400° C. to 500° C.

The adsorbent prepared by ion-exchanging and impregnation has a larger CO adsorption amount and a smaller $CO_2$ adsorption amount than those of the absorbent prepared by only ion-exchanging or impregnation. For this reason, the CO adsorption amount is larger than the $CO_2$ adsorption amount at room temperature (about 20° C.). This tendency typically occurs when the temperature is increased to 60° C. and preferably 100° C. Therefore, the CO selective adsorption function is greatly improved, and the desorption function is also improved. The $N_2$ adsorption amount in this temperature range is very small and does not adversely affect the CO selective adsorption function.

The adsorbent of the present invention has the following effects:

(1) In the temperature range where the CO adsorption amount is larger than the $CO_2$ adsorption amount, CO can be separated from a gas containing both CO and $CO_2$ in a single step, thus improving the desorption property.

(2) Since the CO adsorption amount is large, the required adsorbent amount per unit amount of gas to be treated is reduced.

(3) Energy for heating the adsorption tower and/or the gas to be treated need not be used thereby greatly reduce the operation cost.

(4) Since the treatment is carried out in a temperature range close to normal temperature, heat resistance of a switching valve and the like of the PSA apparatus need not be considered.

The selective adsorbent for CO according to the present invention is applicable to: natural gases containing CO, $CO_2$, $N_2$, or $H_2$; modified gases such as naphtha; gases refined from coal, coke, or heavy oil; steelmaking plant gases, especially a blast furnace gas and a converter gas; byproduct gases in an oil refining plant and a petrochemical plant.

The present invention will be described in more detail by way of reference examples, comparative examples, and examples.

Reference Example 1

A 1N $CuCl_2$ solution was prepared. 10 g of NaY type zeolite (pellets having a diameter of 1.5 mm and a length of 5 mm and containing 20% of a binder) and 50 ml of the 1N CuCl solution were added to a 100-ml round-bottom flask. A condenser was mounted on the flask, and the mixture was heated by a mantle heater. The mixture was refluxed at a temperature of 100° C. for 2 hours. After the heated mixture was left to stand, the supernatant liquid was recovered by decantation. 50 ml of 1N $CuCl_2$ solution were added to the residue to repeat reflux. The reflux was repeated a total of five times. The zeolite was sufficiently washed with distilled water and was dried at 110° C. The dried zeolite was baked in an electrical furnace at 550° C. for 2 hours to prepare an adsorbent. The recovered supernatant liquid and a filtered liquid were mixed, and the resultant mixture was subjected to emission spectroanalysis so as to calculate the amount of Na, thereby measuring an ion exchange ratio of 86.5%. The amount of Cu carried in the zeolite was 8.87%.

One gram of the resultant adsorbent was put into a 20-ml sampling bottle and set in a constant-pressure adsorption amount-measuring apparatus. The sampling bottle was placed in a silicone oil tank and evacuated to a vacuum of $10^{-3}$ mmHg at a temperature of 250° C. for 2 hours, thereby drying the adsorbent. CO gas (99.9% or more of purity) was supplied to the sampling bottle, and reduction was performed at atmospheric pressure and at 250° C. for an hour. After the reduction, the sampling bottle containing the reduced adsorbent was evacuated again to a vacuum of $10^{-3}$ mmHg at 250° C. for 2 hours.

The sampling bottle was cooled and placed in the silicone oil tank. The bottle was kept at a measuring temperature in the tank for 20 to 30 minutes. He gas (99.9% or more of purity) at the atmospheric pressure was supplied to the sampling bottle to measure an adsorption amount and hence the capacity until adsorption equilibrium was reached. After the adsorption equilibrium was measured from 20° C. to 150° C., the temperature was increased. After the measurement was completed, the adsorbent was heated at 250° C. and $10^{-3}$ mmHg for an hour to remove the absorbed gases, and was left to cool. The adsorption amounts of CO, $CO_2$, and $N_2$ at atmospheric pressure were measured by using a gas to be measured. The adsorbent was then heated in a vacuum to remove the absorbed gases and was accurately measured. By using the measured weight, the equilibrium adsorption amount per unit weight was measured.

Figure 1:
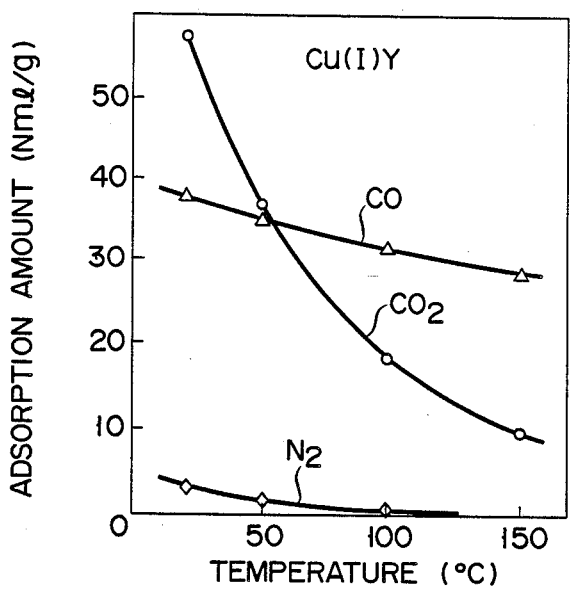
FIG. 1 is a graph showing the relationship between the temperature and the adsorption amount in an experiment in Reference Example 1.

The test results are shown in FIG. 1. The CO adsorption amount is larger than the $CO_2$ adsorption amount at temperatures higher than 50° C. The ratio $CO/CO_2$ is increased, and the CO adsorption amount is gradually decreased according to an increase in temperature.

Example 1

Ten grams of Cu(II)Y type zeolite, ion-exchanged by the method described in Reference Example 1, were measured and put into a 100-ml eggplant-type flask. The flask was set in a rotary vacuum evaporator and evaporated at 95° C. or more. After the evaporation, the sample was cooled to room temperature.

Meanwhile, 8.3 g of $CuCl_2.2H_2O$ were dissolved in water at room temperature to prepare a 20-ml solution. This solution was a substantially $CuCl_2$ saturated solution.

A capillary was mounted on a leak cock of the rotary vacuum evaporator, and the above solution was dripped 2 or 3 droplets at a time into the adsorbent while the eggplant-type flask was kept in a vacuum.

When the adsorbent was uniformly wet, dripping of the solution was stopped, and the internal pressure of the flask was set at atmospheric pressure. The sample impregnated with the solution was placed in a suction filter with a metal net. The remaining solution was poured on the sample. The sample was subjected to suction filtering for about 30 minutes, and then placed on a magnetic tray. The sample was dried naturally for 24 hours. After drying, the sample was dried in a vacuum drier at 110° for 3 hours, thereby preparing an adsorbent of the present invention. The amount of Cu carried in the adsorbent was 15.96 wt%.

Following the same procedures as in Reference Example 1), the resultant adsorbent (to be described as Cu(II)Y+CuCl$_2$) was reduced, and equibrium adsorption amounts of CO, CO$_2$, and N$_2$ were measured within the temperature range of 20° C. to 100° C. The reduction reaction converted Cu(II)Y+CuCl$_2$ into Cu(I)Y+CuCl.

Figure 2:
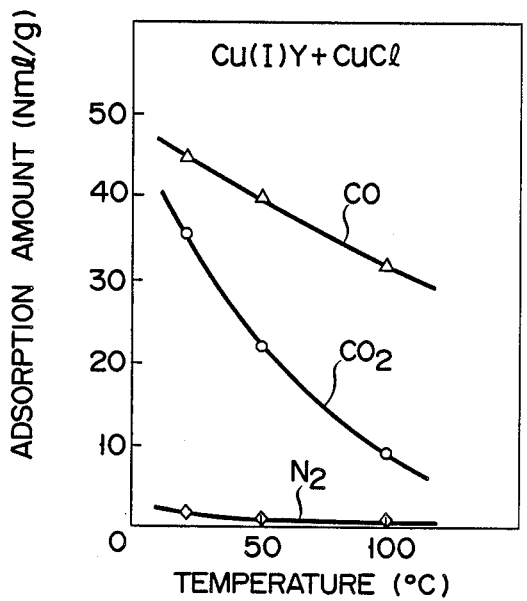
FIGS. 2 and 3 are graphs showing the relationships between the temperatures and the adsorption amounts in experiments in Examples 1 and 2 respectively.

The results are shown in FIG. 2. The CO and CO$_2$ equilibrium adsorption amounts of the adsorbent in Example 1 are respectively larger and smaller than those of the adsorbent of Reference Example 1 prepared by only ion-exchanging. Therefore, the sufficient CO selective adsorption capacity is obtained in the temperature range up to 100° C.

Example 2

Following the same procedures as in Example 1 except that CuBr$_2$ was used in place of CuCl$_2$.2H$_2$O, 11.2 g of CuBr$_2$ were dissolved in water at room temperature to prepare a 20-ml solution. The resultant adsorbent (Cu(II)Y+CuBr$_2$; the amount of Cu carried in a zeolite was 16.42 wt%) was reduced in the same manner as described above in Reference Example 2. CO and CO$_2$ equilibrium adsorption amounts were measured. The reduction reaction converted Cu(II)Y+CuBr$_2$ into Cu(I)Y+CuBr.

Figure 3:
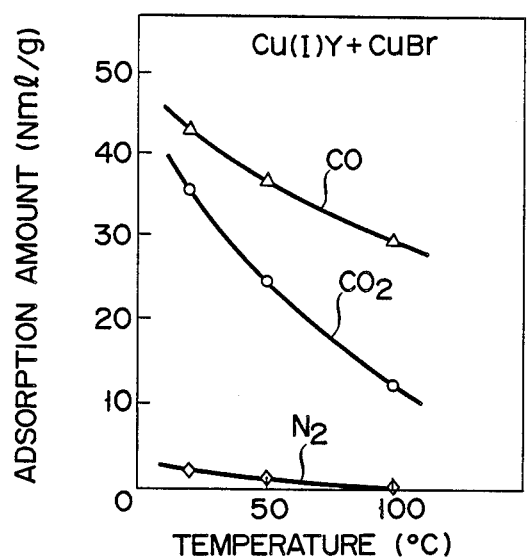

The test results are shown in FIG. 3. As is apparent from these results, a sufficient CO selective adsorption capacity is realized in the temperature range of room temperature to 100° C. in the same manner as in Example 1.

Comparative Example 1

Following the procedures as in Example 1, an NaY type zeolite carrying CuCl$_2$, not by ion-exchanging as in Reference Example 1 but by impregnation as in Example 1 to prepare an adsorbent (NaY+CuCl$_2$; the amount of Cu carried in the zeolite was 11.93 wt%), was reduced by the same method as in Reference Example 1. CO and CO$_2$ equilibrium adsorption amounts were measured. The reduction reaction converted NaY+CuCl$_2$ into NaY+CuCl.

Figure 4:
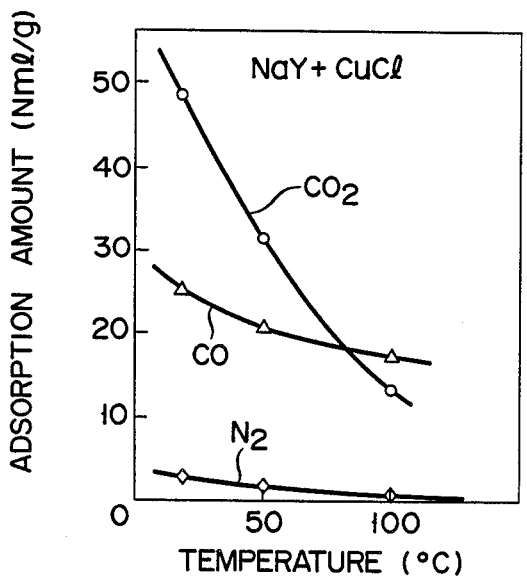
FIG. 4 is a graph showing the relationship between the temperature and the adsorption amount in an experiment in Comparative Example 1.

The results are shown in FIG. 4. The CO selective adsorption capacity of the adsorbent prepared by only impregnation was insufficient and is poorer than that of the adsorbent prepared by only ion-exchanging in Reference Example 1.

Example 3

Figure 5:
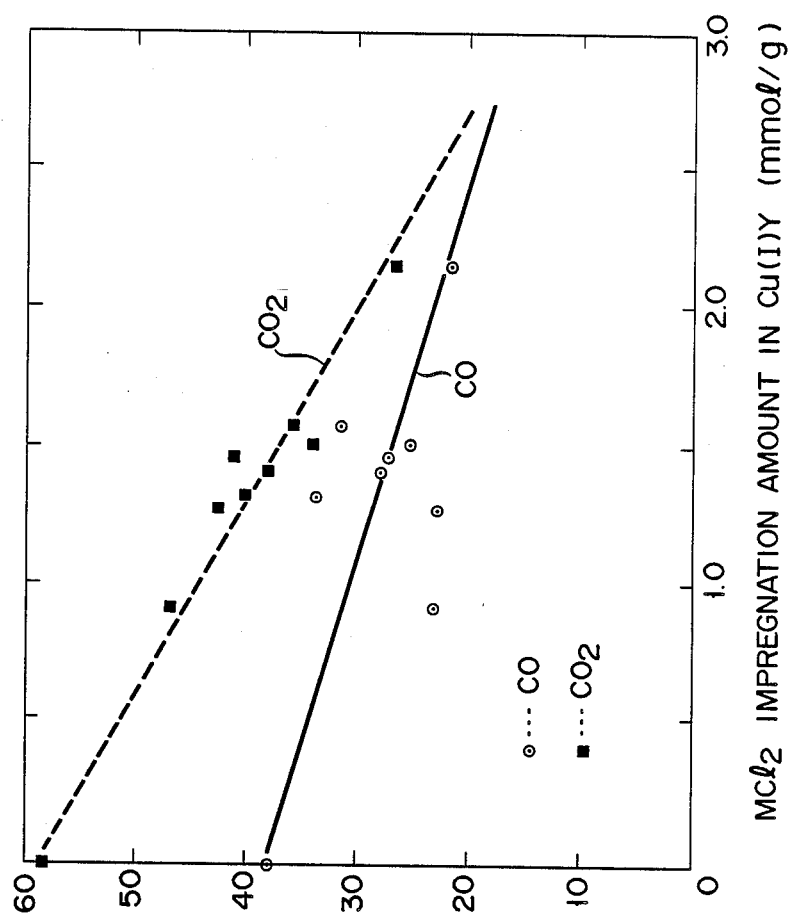
FIG. 5 is a graph showing the relationship between the $MCl_2$ impregnation amount and CO and $CO_2$ adsorption amounts in Cu(I)Y+$MCl_2$ in Example 3.

Cu(II)Y was impregnated with predetermined amounts of FeCl$_3$, ZnCl$_2$, NiCl$_2$, and MgCl$_2$ and was reduced by the same method as in Reference Example 1. CO and CO$_2$ adsorption amounts and a CO/CO$_2$ ratio were measured. The reduction reaction converted Cu(II)Y+MCl$_2$ into Cu(I)Y+MCl$_2$. MCl$_2$ was a metal chloride. The results with adsorbents containing metal chlorides MnCl$_2$, CaCl$_2$, and BaCl$_2$ excluded from those of the present invention and an adsorbent without a metal chloride are shown in Table 1 and FIG. 5. The selectivity ratio of CO/CO$_2$ of the present invention is higher than that of Cu(I)Y not impregnated with a metal chloride, as is apparent from Table 1.

TABLE 1

Measurement Representing Amounts of Various Metal Chlorides Impregnated into Cu(I)Y and CO/CO$_2$ Adsorption Amounts

| | Metal Chloride | Impregnation Amount MCl$_2$/Cu(I)Y (mmol/g) | CO Adsorption Amount at 20° C. (Nml/g) | CO$_2$ Adsorption Amount at 20° C. (Nml/g) | CO/CO$_2$ Selectivity |
|---|---|---|---|---|---|
| Present Invention | FeCl$_3$ | 1.533 | 25.70 | 34.73 | 0.740 |
| Present Invention | ZnCl$_2$ | 1.580 | 31.58 | 36.18 | 0.873 |
| Present Invention | NiCl$_2$ | 1.424 | 27.98 | 38.45 | 0.728 |
| Present Invention | MgCl$_2$ | 2.158 | 22.04 | 26.75 | 0.824 |
| Comparative Example | MnCl$_2$ | 1.475 | 27.54 | 41.88 | 0.658 |
| Comparative Example | CaCl$_2$ | 1.292 | 23.45 | 43.02 | 0.545 |
| Comparative Example | BaCl$_2$ | 0.933 | 23.46 | 46.83 | 0.501 |
| Reference Example | Cu(I)Y | — | 38.24 | 57.99 | 0.659 |

Example 4

A CuCl$_2$ impregnation amount per gram of Cu(II)Y was changed. Following the same procedures as in Reference Example 1, reduction was performed, and CO and CO$_2$ adsorption amounts (20° C.) of Cu(I)Y+CuCl$_2$ were measured. The results are shown in FIG. 6. The CO adsorption amount exceeds the CO$_2$ adsorption amount when 0.8 mmol/g to 2.5 mmol/g of CuCl$_2$ is contained. The CO/CO$_2$ ratio is 1.1 or more when 1.0 to 2.0 mmol/g of CuCl$_2$ is contained.

Example 5

Ten grams of Cu(II)Y+CuCl$_2$ prepared by the same procedures as in Example 1 were filled in a glass tube having a diameter of 22 mm, and the glass tube was set in an annular electric furnace. The height of the Cu(II)Y+CuCl$_2$ in the glass tube was about 2 cm. N$_2$ gas was supplied at a flow rate of 1.0 Nl/min, and the Cu(II)Y+CuCl$_2$ was heated to a predetermined temperature and kept thereat for an hour. After heating, the Cu(II)Y+CuCl$_2$ was cooled to room temperature, and the resultant adsorbent was removed.

One gram of the adsorbent was placed in a 20-ml sampling bottle, and the bottle was set in a constant pressure adsorption amount-measuring apparatus. The adsorbent was heated to a temperature of 250° C. in a vacuum of 10$^{-3}$ mmHg for 2 hours.

Subsequently, the sampling bottle was placed in a silicone oil tank and kept at 20° C. He gas (99.9% or more of purity) at the atmospheric pressure was supplied to the bottle. The adsorption amounts and hence the capacity were measured until adsorption equilibrium was reached. After measurement, the bottle was heated at 250° C. and 10$^{-3}$ mmHg for an hour. The sample was then cooled, and the sampling bottle was placed in the silicone oil tank at 20° C. CO gas (99.9% or more) was supplied to the sampling bottle to measure the equilibrium adsorption amount at the atmospheric pressure. This adsorption amount was the one before reduction.

The silicone oil tank was heated and kept at 250° C., and the sample was reduced in the CO atmosphere for 60 minutes. After reduction, CO was removed from the sample such that the sample was heated to 250° C. in a vacuum of $10^{-3}$ mm Hg for 2 hours. The sample was then left to cool. The cooled sample in the bottle was placed in the silicone oil tank and kept at 20° C. Under this condition, CO gas (99.9% or more of purity) was supplied to the bottle, and the CO equilibrium adsorption amount at atmospheric pressure was measured. This adsorption amount was the one after reduction. Similarly, the sample was heated in a vacuum to remove CO, and then $CO_2$ equilibrium adsorption amount at 20° C. and the atmospheric pressure was measured. After the sample was heated in a vacuum to remove $CO_2$, the sample was weighed. The equilibrium adsorption amount per unit weight was calculated by using the measured weight.

CO equilibrium adsorption amounts before and after the reduction, $CO_2$ equilibrium adsorption amounts after the reduction, and selectivity ratio of $CO/CO_2$ at temperatures of 350°, 400°, 450°, 500°, and 550° C. are shown in Table 2. For comparison, the measurement results at 600° C. and 250° C. (the latter is the pretreatment temperature of equilibrium adsorption amount measurement) are also shown. As is apparent from Table 2, when the heating temperature is increased, the CO equilibrium adsorption amount before the reduction is increased, and the impregnated and carried $CuCl_2$ is gradually converted into CuCl having a CO adsorption capacity.

Up to the heating temperature of 500° C., the CO equilibrium adsorption amounts before and after the reduction are increased. However, when the heating temperature exceeds 500° C., the CO equilibrium adsorption amount is decreased, and the $CO_2$ equilibrium adsorption amount after the reduction is increased. It is thus found that the impregnated and carried $CuCl_2$ and the converted CuCl are evaporated from the adsorbent.

TABLE 2

Equilibrium Adsorption Amount Measurement Data After Heating of Cu(II)Y + $CuCl_2$

| | Heating Temperature (°C.) | CO Adsorption Amount at 20° C. After Reduction (Nml/g) | CO Adsorption Amount at 20° C. After Reduction (Nml/g) | $CO_2$ Adsorption Amount at 20° C. After Reduction (Nml/g) | $CO/CO_2$ Selectivity After Reduction |
|---|---|---|---|---|---|
| Present Invention | 350 | 14.56 | 49.53 | 39.22 | 1.263 |
| Present Invention | 400 | 20.59 | 51.95 | 42.54 | 1.221 |
| Present Invention | 450 | 25.27 | 53.14 | 42.32 | 1.256 |
| Present Invention | 500 | 33.27 | 55.41 | 43.42 | 1.276 |
| Present Invention | 550 | 23.58 | 53.89 | 43.65 | 1.235 |
| Comparative Example | 250 | 8.43 | 44.64 | 35.36 | 1.262 |
| Comparative Example | 600 | 18.53 | 52.11 | 47.05 | 1.108 |

Reference Example 2

A PSA test apparatus having four adsorption towers made of SUS 304 stainless steel each having a size of 2"×800 mm was used to obtain a relationship between the recovery ratio and the CO purity of the recovered gas by using the adsorption temperature as a parameter. Each tower comprised a mantle heater with a thermostat to keep the interior temperature within the range of 10° C. of the preset temperature.

A 1N $CuCl_2$ solution was prepared, and 10 g of NaY type zeolite (in the form of pellets having a diameter of 1.5 mm and a length of 5 mm and including 20% of a binder) and 50 ml of 1N $CuCl_2$ solution were poured in a 100-ml round-bottom flask. A condenser was mounted on the round-bottom flask, and the flask was heated by a mantle heater at 100° C. for 2 hours to reflux the mixture therein. After the flask was left to stand, the supernatant liquid was removed by decantation. Thereafter, another 50 ml of the 1N $CuCl_2$ solution were added to the round bottom flask, and the mixture was refluxed again, following the same procedures as described above. The reflux was repeated a total of five times. The zeolite was sufficiently washed with distilled water, dried at 110° C., and pulverized. The zeolite powder was then sintered in an electric furnace at 550° C. for 2 hours to prepare an adsorbent. The recovered supernatant and filtered solutions were mixed, and the solution mixture was subjected to emission spectroanalysis, thereby measuring the Na amount and hence an ion exchange ratio of 86.5%. The amount of Cu carried per unit weight of adsorbent was 8.87 wt%.

One kilogram of 1/16" granular pellets (including 20% of a granulating agent) of the resultant Cu(II) Y type zeolite were filled in each tower and gases were desorbed from the zeolite by heating at 250° and 50 Torr for about 5 hours. Pure CO gas was filled in each tower and then supplied thereto at a flow rate of about 1 l/min for about 2 hours, thereby reducing Cu(II)Y into Cu(I)Y. The 4-tower PSA apparatus generally repeats a cycle of adsorption, purging, desorption, and compression.

Desorption and refinement of a gas sample assumed as a converter gas having the following composition were tested by using the 4-tower PSA apparatus.

| Gas Composition: | CO: | 74.5% |
|---|---|---|
| | $CO_2$: | 14.0% |
| | $H_2$: | 1.0% |
| | $N_2$: | 10.5% |

An adsorption temperature was 165±10° C., an adsorption pressure was 1 kg/cm²G, and a gas desorbing pressure was 50 Torr. A ratio of the purge gas to the gas to be removed, and a source gas flow rate were changed, and a gas flow speed in the tower was kept substantially constant. A relationship between the CO recovery ratio and the CO purity of the recovered gas was determined.

As an example, if the supply gas flow rate was 0.76 l/min, and the purge amount/desorbing amount ratio was 0.73, the CO recovery ratio was 73%, and the recovered gas composition was as follows:

| | |
|---|---|
| CO: | 96.2% |
| $CO_2$: | 3.0% |
| $N_2$: | 0.7% |
| $H_2$: | 0.1% |

Figure 7:
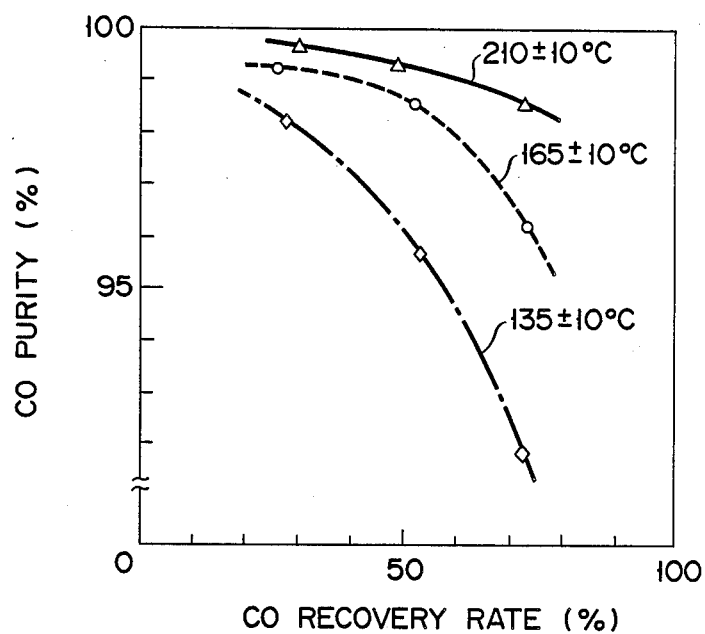
FIG. 7 is a graph showing the relationship between the CO recovery ratio and the CO purity in the experiments in Reference Examples 2 to 4.

The relationship between the CO purity and the CO recovery ratio is indicated by the broken line in FIG. 7.

Reference Example 3

Following the same procedures with the same apparatus as in Reference Example 2, except that an adsorption temperature was set at 210±10° C., the relationship between the recovery ratio and the product CO purity was determined.

As an example, if the supply gas flow rate was 0.70 l/min, and the purge amount/desorbing amount ratio was 0.74, the CO recovery ratio was 72%, and the recovered gas composition was as follows:

| | |
|---|---|
| CO: | 98.5% |
| $CO_2$: | 1.0% |
| $N_2$: | 0.4% |
| $H_2$: | 0.1% |

The relationship between the product CO purity and the recovery ratio is indicated by the solid line in FIG. 7.

As is apparent from the above test results, when the adsorption temperature is increased, the product CO impurity is increased with respect to an identical CO recovery ratio. At the same time, by decreasing the CO recovery ratio to about 50%, the product CO purity is increased to 99% or more.

Reference Example 4

Following the same procedures with the same apparatus as in Reference Example 2, except that an adsorption temperature was set at 135°±10° C., the relationship between the recovery ratio and the product CO purity was determined.

As an example, if the supply gas flow rate was 0.72 l/min, and the purge amount/desorbing amount ratio was 0.73, the CO recovery ratio was 72%, and the recovered gas composition was as follows:

| | |
|---|---|
| CO: | 93.1% |
| $CO_2$: | 5.2% |
| $N_2$: | 1.4% |
| $H_2$: | 0.3% |

The relationship between the product CO purity and the recovery ratio is indicated by the alternate long and short dashed line in FIG. 7.

As is apparent from the above results, when the adsorption temperature is 150° C. or less, the product CO purity is decreased below 95% with respect to the recovery ratio of about 70%. In order to maintain the product CO purity to be about 98%, the recovery ratio must be reduced to about 30%.

Example 6

Ten grams of Cu(II)Y type zeolite (pellets having a diameter of 1.5 mm and a length of 5 mm) ion-exchanged by the method described in Reference Example 2 were measured and put into a 100-ml eggplant-type flask. The flask was set in a rotary vacuum evaporator and evaporated at 95° C. or more. After the evaporation, the sample was cooled to room temperature.

Meanwhile, 8.3 g of $CuCl_2.2H_2O$ were dissolved in water at room temperature to prepare a 20-ml solution. This solution was a substantially $CuCl_2$ saturated solution. A capillary was mounted on a leak cock of the rotary vacuum evaporator, and the above solution was dripped 2 or 3 droplets at a time into the adsorbent while the eggplant-type flask was kept in a vacuum.

When the adsorbent was uniformly wet, dripping of the solution was stopped. The internal pressure of the flask was set at atmospheric pressure. The sample impregnated with the solution was placed in a suction filter with a metal net. The remaining solution was poured on the sample. The sample was subjected to suction filtering for about 30 minutes, and then placed on a magnetic tray. The sample was dried naturally for 24 hours. After drying with air, the sample was dried in a vacuum drier at 110° for 3 hours, thereby preparing an adsorbent of the present invention. The amount of Cu carried in the adsorbent was 15.96 wt%.

Thereafter, 1,250 g of 1/16" granular pellets (containing 20% of a granulating agent) of the adsorbent (referred to as Cu(II)Y+$CuCl_2$) were filled in each tower in the same apparatus as in Reference Example 2, and an adsorption temperature was set to be 90±10° C. Following the same procedures as in Reference Example 2 except for the adsorption temperature, a product CO purity and a recovery ratio were calculated. The amount of pellets filled in each tower was increased by 250 g as compared with that in Reference Example 2 because Cu(II)Y+$CuCl_2$ had a larger apparent specific gravity than that of Cu(II)Y in Reference Example 2.

As an example, if a supply gas flow rate was 1.23 l/min, a purge amount/desorbing amount ratio was 0.63, the CO recovery ratio was 78% and the recovered gas composition was as follows:

| | |
|---|---|
| CO: | 99.9% |
| $CO_2$: | Tr |
| $N_2$: | 0.1% |
| $H_2$: | Tr |

The relationship between the product CO purity and the CO recovery ratio is indicated by the solid line in FIG. 8.

Example 7

Following the same procedures as in Example 6 except that the adsorption temperature was set to be 70±10° C., a product CO purity and a recovery ratio were measured.

As an example, if a supply gas flow rate was 1.10 l/min, a purge amount/desorbing amount ratio was 0.64, the CO recovery ratio was 78% and the recovered gas composition was as follows:

| | |
|---|---|
| CO: | 98.2% |
| CO$_2$: | 1.7% |
| N$_2$: | 0.1% |
| H$_2$: | Tr |

The relationship between the product CO purity and the CO recovery ratio is indicated by the alternate long and short dashed line in FIG. 8.

Example 8

Following the same procedures as in Example 6 except that the adsorption temperature was set to be 50±10° C., a product CO purity and a recovery ratio were measured.

As an example, if a supply gas flow rate was 1.03 l/min, a purge amount/desorbing amount ratio was 0.71, the CO recovery ratio was 78% and the recovered gas composition was as follows:

| | |
|---|---|
| CO: | 95.4% |
| CO$_2$: | 4.4% |
| N$_2$: | 0.2% |
| H$_2$: | Tr |

The relationship between the product CO purity and the CO recovery ratio is indicated by the broken line in FIG. 8.

Example 9

Following the same procedures as in Example 6 except that the adsorption temperature was set to be 30±10° C., a product CO purity and a recovery ratio were measured.

As an example, if a supply gas flow rate was 1.02 l/min, a purge amount/desorbing amount ratio was 0.71, the CO recovery ratio was 73% and the recovered gas composition was as follows:

| | |
|---|---|
| CO: | 87.5% |
| CO$_2$: | 12.1% |
| N$_2$: | 0.4% |
| H$_2$: | Tr |

The relationship between the product CO purity and the CO recovery ratio is indicated by the alternate long and two short-dashed line in FIG. 8.

What is claimed is:

1. An adsorbent, for selectively adsorbing carbon monoxide from a gas mixture containing at least carbon monoxide and carbon dioxide, comprising mainly Cu (I), ion-exchanged and carried in a cation exchange site of a zeolite at an ion exchange ratio of not less than 50%, the zeolite having a silica/alumina ratio of not more than 10; and a salt of at least one metal selected from the group consisting of Cu(I), Fe, Zn, Ni, and Mg, the metal salt being dispersed and carried in pores of the zeolite.

2. The adsorbent according to claim 1, wherein the Cu(I) is carried in the cation exchange site of the zeolite at an ion exchange ratio of not less than 70%.

3. The adsorbent according to claim 1, wherein mainly a Cu(I) salt is dispersed and carried in the pores of the zeolite.

4. The adsorbent according to claim 3, wherein the Cu(I) salt is dispersed and carried in the pores in an amount of 0.8 mmol to 2.5 mmol per gram of the ion-exchanged Cu(I) zeolite.

5. The adsorbent according to claim 3, wherein the Cu(I) salt is dispersed and carried in the pores in an amount of 1.0 mmol to 2.0 mmol per gram of an ion-exchanged Cu(I) zeolite.

6. The adsorbent according to claim 3, wherein the Cu(I) salt is Cu(I) halide.

7. The adsorbent according to claim 6, wherein the Cu(I) halide is Cu(I) chloride.

8. The adsorbent according to claim 1, wherein the metal salt dispersed and carried in the pores of the zeolite is a halide.

9. The adsorbent according to claim 8, wherein the halide is a chloride.

10. The adsorbent according to claim 1, wherein the zeolite having the silica/alumina ratio of not more than 10 is a Y type zeolite.

11. The adsorbent according to claim 1, wherein the adsorbent is treated by pressure swing adsorption at a temperature of not more than 100° C., so that carbon monoxide is selectively desorbed and refined.

12. A method of manufacturing an adsorbent for selectively adsorbing carbon monoxide from a gas mixture containing at least carbon monoxide and carbon dioxide, comprising the steps of:
ion-exchanging and carrying Cu(II) in a cation exchange site of a zeolite at an ion exchange ratio of not less than 50%, the zeolite having a silica/alumina ratio of not more than 10;
dispersing and carrying a salt of at least one metal selected from the group consisting of Cu(II), Fe, Zn, Ni, and Mg in pores of the zeolite according to an impregnation method; and
reducing the Cu(II) and the Cu(II) salt with a reducing gas to obtain Cu(I) and a Cu(I) salt.

13. The method according to claim 12, wherein the Cu(II) is ion-exchanged and carried in the cation exchange site of the zeolite at an ion exchange ratio of not less than 70%.

14. The method according to claim 12, where mainly the Cu(II) salt is dispersed and caerried in the pores of the zeolite by the impregnation method.

15. The method according to claim 12, wherein the Cu(II) is carried by the zeolite by an ion exchange method, and then the metal salt is dispersed and carried in the pores of the zeolite by the impregnation method.

16. A method of manufacturing an adsorbent for selectively adsorbing carbon monoxide from a gas mixture containing at least carbon monoxide and carbon dioxide, comprising the steps of:
ion-exchanging and carrying Cu(II) in a cation exchange site of a zeolite at an ion exchange ratio of not less than 50%, the zeolite having a silica/alumina ratio of not more than 10;
dispersing and carrying a Cu(II) salt in pores of the zeolite by an impregnation method;
heating in an inert atmosphere, the Cu(II) salt dispersed and carried by the impregnation method to obtain a Cu(I) salt; and
reducing the Cu(II) and the residual Cu(II) salt with a reducing gas to obtain mainly Cu(I) and the Cu(I)salt.

17. The method according to claim 16, wherein the Cu(II) is ion-exchanged and carried in the ion exchange site of the zeolite at an ion exchange ratio of not less than 70%.

18. The method according to claim 16, wherein the Cu(II) is carried by the zeolite by an ion exchange method, and then the metal salt is dispersed and carried in the pores of the zeolite by the impregnation method.

19. The method according to claim 16, wherein the step of heating is performed in a temperature range of 350° to 550° C.

20. The method according to claim 16, wherein the step of heating is performed in a temperature range of 400° C. to 500° C.

* * * * *